United States Patent
Cheah et al.

(10) Patent No.: US 12,367,230 B2
(45) Date of Patent: Jul. 22, 2025

(54) METHODS, SYSTEMS, AND COMPUTER-READABLE MEDIA FOR GENERATING LABELLED DATASETS

(71) Applicant: Xero Limited, Wellington (NZ)

(72) Inventors: Soon-Ee Cheah, Wellington (NZ); Rebecca Dridan, Wellington (NZ)

(*) Notice: Subject to any disclaimer, the term of this patent is extended or adjusted under 35 U.S.C. 154(b) by 0 days.

(21) Appl. No.: 18/243,950

(22) Filed: Sep. 8, 2023

(65) Prior Publication Data

US 2023/0418858 A1  Dec. 28, 2023

Related U.S. Application Data

(63) Continuation of application No. PCT/NZ2023/050011, filed on Mar. 28, 2023.

(30) Foreign Application Priority Data

Mar. 21, 2022 (AU) ................. 2022900697

(51) Int. Cl.
*G06F 16/355* (2025.01)
(52) U.S. Cl.
CPC ................. *G06F 16/355* (2019.01)
(58) Field of Classification Search
CPC ................................ G06F 16/355
See application file for complete search history.

(56) References Cited

U.S. PATENT DOCUMENTS

| | | | |
|---|---|---|---|
| 2016/0321358 A1* | 11/2016 | Kanani | G06F 40/284 |
| 2018/0247247 A1* | 8/2018 | Xu | G06Q 10/06393 |
| 2021/0073257 A1 | 3/2021 | Newey | |
| 2021/0149993 A1* | 5/2021 | Torres | G06F 40/295 |
| 2021/0232701 A1 | 7/2021 | Goel et al. | |
| 2021/0406451 A1* | 12/2021 | Iyer | G06V 30/40 |
| 2022/0366214 A1* | 11/2022 | Wu | G06N 3/042 |
| 2023/0022845 A1* | 1/2023 | Meng | G06F 40/295 |
| 2023/0245485 A1* | 8/2023 | Rimchala | G06V 30/413 382/176 |

OTHER PUBLICATIONS

North. "Data Mining for the Masses" pp. 1-264. Web. 2012; [retrieved Jun. 3, 2023]. Retrieved from the Internet: <URL:https://docs.rapidminer.com/downloads/DataMiningForTheMasses.pdf> pp. 1-264.

* cited by examiner

*Primary Examiner* — Hares Jami
(74) *Attorney, Agent, or Firm* — Young Basile Hanlon & MacFarlane, P.C.

(57) ABSTRACT

A method comprises determining token(s) from financial documents and determining a set of preliminary attribute labels for the token(s), wherein the set is associated with attribute type(s). The method further comprises providing the set for each token to an attribute prediction model to determine, for the token, a confidence value for each attribute type(s), determining subsets of token, each subset being associated with a respective document of the plurality of documents and determining a set of refined labels for each document based on the confidence values, wherein the set of refined labels comprises a value for attribute type(s).

20 Claims, 3 Drawing Sheets

METHODS, SYSTEMS, AND COMPUTER-READABLE MEDIA FOR GENERATING LABELLED DATASETS

CROSS-REFERENCE TO RELATED APPLICATION(S)

This application is a continuation of International Application Serial No. PCT/NZ2023/050011, filed Mar. 28, 2023, which claims priority to and the benefit of Australian Patent Application Serial No. 2022900697, filed Mar. 21, 2022, the entire disclosures of which are hereby incorporated by reference.

TECHNICAL FIELD

Embodiments generally relate to methods, systems, and computer-readable media for generating labelled datasets. Some embodiments relate to generating labels for documents, such as financial or accounting documents, to associate the documents with particular entity attributes, such as entity names, and/or bank details.

BACKGROUND

Accounting documents, such as invoices or receipts, tend to include information about an entity, such as the organisation or business that issued the invoice or receipt, as well as financial details, such as amounts and account numbers associated with the organisation. Various organisations provide services whereby such data is extracted from the accounting documents and provided in a form that can be used to populate user records, such as transaction records, which may be associated with user accounts with accounting platforms. Although automatic data extraction techniques are known, many are unreliable at efficiently and accurately extracting the relevant data.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

SUMMARY

Some embodiments relate to a method comprising: determining one or more tokens from each of a plurality of financial documents; determining a set of preliminary attribute labels for each of the one or more tokens, wherein the set of attribute labels are associated with one or more attribute types; providing the set of preliminary attribute labels for each token to an attribute prediction model to determine, for each token, a confidence value for each of the one or more attribute types; determining a plurality of subsets of tokens, each subset being associated with a respective document of the plurality of documents; and determining a set of refined labels for each document based on the confidence values associated with the tokens of the respective subset of tokens, wherein the set of refined labels comprises a value for one or more attribute types.

Each of the one or more attribute types may have one or more inherent characteristics determinable from its respective value.

In some embodiments, determining the one or more tokens from each of a plurality of financial documents may comprise determining the one or more tokens based on at least one of the one or more inherent characteristics of the one or more attribute types;

In some embodiments, the attribute prediction model may be an expectation maximisation model.

In some embodiments, the method comprises training the attribute prediction model using the sets of preliminary attribute labels for the tokens before providing the sets of preliminary attribute labels for each token to the attribute prediction model to determine the confidence values for each token.

In some embodiments, determining the sets of preliminary attribute labels may comprise providing the one or more tokens to one or more attribute labelling modules to determine, for each token, the sets of preliminary attribute labels and wherein each of the one or more attribute labelling modules is configured to determine preliminary attribute labels of a different attribute type.

In some embodiments, the one or more attribute labelling modules comprises a first digit detector configured to detect a fixed number span of digits within a candidate token, and responsive to determining that the candidate token comprises the fixed number span of digits, assigning the candidate token a first preliminary label of a first attribute type, and responsive to determining that the candidate token does not comprise the fixed number span of digits, assigning the candidate token a first preliminary label indicative of the token not being representative of the first attribute type.

In some embodiments, the one or more attribute labelling modules comprises a first label detector configured to detect a character stream in a proximal token to the candidate token that corresponds to a first label of the first attribute type, and responsive to determining that the proximal token comprises the character stream corresponding to the first label, assigning the candidate token a second preliminary label of the first attribute type, and responsive to determining that the proximal token does not comprise the character stream corresponding to the first label, assigning the candidate token a second preliminary label indicative of the candidate token not being representative of the first attribute type.

In some embodiments, the one or more attribute labelling modules comprises a check sum calculator configured to verify that a span of digits detected by the first digit detector is a number that complies requirements of the first attribute type, and responsive to determining that the number complies with the requirements, assigning the candidate token a third preliminary label of the first attribute type, and responsive to determining that the candidate token does not comply with the requirements, assigning the candidate token a third preliminary label indicative of the token not being representative of the first attribute type.

In some embodiments, the one or more attribute labelling modules comprises a second digit detector configured to detect a fixed number span of digits within a candidate token, and responsive to determining that the candidate token comprises the fixed number span of digits, assigning the candidate token a first preliminary label of a second attribute type, and responsive to determining that the candidate token does not comprise the fixed number span of digits, assigning the candidate token a first preliminary label indicative of the candidate token not being representative of the second attribute type.

In some embodiments, the one or more attribute labelling modules comprises a second label detector configured to detect a character stream in a proximal token to the candidate token that corresponds to a second label of the second attribute type, and responsive to determining that the proximal token comprises the character stream corresponding to the second label, assigning the candidate token a second preliminary label of the second attribute type, and responsive to determining that the proximal token does not comprise the character stream corresponding to the second label, assigning the candidate token a second preliminary label indicative of the candidate token not being representative of the second attribute type.

The one or more attribute labelling modules may comprise a verification checker configured to verify that a span of digits detected by the second digit detector is a number that corresponds with a registered number for the second attribute type, and responsive to determining that the number corresponds with the registered number, assigning the candidate token a third preliminary label of the second attribute type, and responsive to determining that the candidate token does not comply with the requirements, assigning the candidate token a third preliminary label indicative of the token not being representative of the second attribute type.

The one or more attribute labelling modules may comprise a third digit detector configured to detect a fixed number span of digits within a candidate token, and responsive to determining that the candidate token comprises the fixed number span of digits, assigning the candidate token a first preliminary label of a third attribute type, and responsive to determining that the candidate token does not comprise the fixed number span of digits, assigning the candidate token a first preliminary label indicative of the token not being representative of the third attribute type.

In some embodiments, the one or more attribute labelling modules comprise a third label detector configured to detect a character stream in a first proximal token to the candidate token that corresponds to a third label of the third attribute type, and responsive to determining that the first proximal token comprises the character stream corresponding to the third label, assigning the candidate token a second preliminary label of the third attribute type, and responsive to determining that the first proximal token does not comprise the character stream corresponding to the third label, assigning the candidate token a second preliminary label indicative of the candidate token not being representative of the third attribute type.

In some embodiments, the one or more attribute labelling modules comprise a fourth label detector configured to detect a character stream in a second proximal token, proximal to the candidate token and/or the first proximal token, that corresponds to a fourth label of the third attribute type, and responsive to determining that the second proximal token comprises the character stream corresponding to the fourth label, assigning the candidate token a third preliminary label of the third attribute type, and responsive to determining that the second proximal token does not comprise the character stream corresponding to the fourth label, assigning the candidate token a third preliminary label indicative of the candidate token not being representative of the third attribute type.

In some embodiments, the method comprises responsive to the confidence value for each attribute label type of the set of attribute label types for a given token falling short of a threshold confidence level, removing the token from the subset of tokens before determining the set of refined labels for the respective document.

In some embodiments, determining the set of refined labels for each document based on the confidence values comprises determining, for each of the one or more attribute types, a token of the subset of tokens having a highest confidence value, and assigning the attribute type the value of the respective token. For example, the one or more attribute types may comprise one or more of: (i) an entity name, (ii) a business name; (iii) a company name; (iv) financial details; (v) a financial institution branch code; and (vi) a financial institution account number. The documents of the first dataset may be accounting documents and a class of the accounting documents may include one or more of: (i) an invoice; (ii) a credit note; (iii) a receipt; (iv) a purchase order; and (v) a quote.

Some embodiments relate to a system comprising: one or more processors; and memory comprising computer executable instructions, which when executed by the one or more processors, cause the system to perform any one of the described methods.

Some embodiments relate to a computer-readable storage medium storing instructions that, when executed by a computer, cause the computer to perform the method of any one of the described methods.

In some embodiments, the computer-readable storage medium of any of the described embodiments is a non-transient computer-readable storage medium.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

BRIEF DESCRIPTION OF THE DRAWINGS

Various ones of the appended drawings merely illustrate example embodiments of the present disclosure and cannot be considered as limiting its scope.

DETAILED DESCRIPTION

Embodiments generally relate to methods, systems, and computer-readable media for generating labelled datasets. Some embodiments relate to generating labels for documents, such as financial or accounting documents, to associate the documents with particular entity attributes, such as entity names, and/or bank details based on information provided in the documents.

Figure 1:
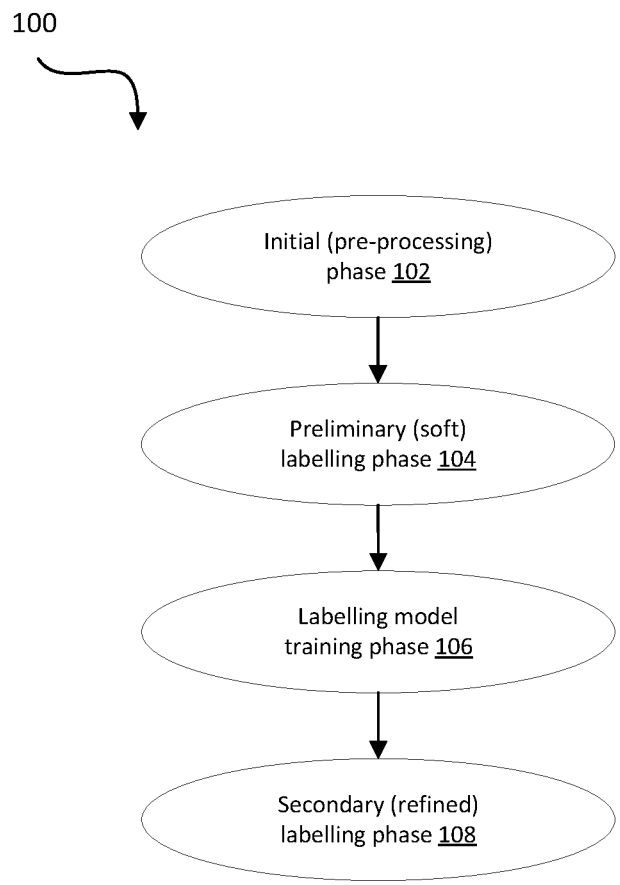
FIG. 1 is an overview of a process for generating a dataset of labelled documents, according to some embodiments.

FIG. 1 is a schematic or overview of a process 100 for generating a dataset of labelled documents, according to some embodiments. For example, the documents may each comprise labels or values for one or more attribute types. As illustrated, the process 100 may involve a plurality of phases or stages.

An initial or pre-processing phase 102 involves extracting character spans or tokens from a text document that meet a particular set of criteria. The text document may be an accounting document, for example, such as an invoice or a receipt. In some embodiments, locations of those tokens within the text document are also determined, for example, character offset span relative to the text document.

Information, as for example, may be represented by distinct character strings, of financial documents and/or accounting document have an underlying structure and/or inherent characteristics that can be relied on to confirm or check the accuracy of the information itself and/or whether or not the information is indicative of a particular attribute. For example, credit card number or account numbers may have a predefined number of digits. This information can be used to verify that a candidate character string is a credit card number or account number, and thereby improve the confidence in the labelling of a document with that candidate character string as the value for the credit card number or account number attribute. As another example, financial domain numbers have checksums which can be leveraged to verify that a candidate character string is a financial domain number, and thereby improve the confidence in the labelling of a document with that candidate character string as the value for the financial domain number attribute.

The criteria for extracting the tokens may depend on one or more attributes to be determined from the text document, and for example, inherent characteristics associated with those attributes. For example, tokens matching the regular expression '\bd[\d-]{5,}\b' may be extracted from the text document; in other words, a span of characters consisting of only digits, spaces and/or hyphens, of at least 6 characters long, and bordered by word boundaries (so it can't be a digit string in the middle of a longer alphanumeric ID). This may be appropriate where the attributes to be extracted include an ABN, a BSB number and/or an account number. A plurality of text documents may be subjected to the pre-processing phase. The pre-processing phase may result in the generation of an initial dataset comprising a plurality of items, each item comprising at least a token. In some embodiments, the items may include a document identifier indicative of the document from which the token was extracted. In some embodiments, the items may include a position indicator indicative of a position or location of the token within the document from which the token was extracted.

The pre-processing phase is followed by a preliminary (or soft) labelling phase 104. For each text document, the extracted tokens are provided to one or more attribute labelling modules, which may each comprise one or more labelling functions. The attribute labelling module(s) may be configured to determine whether the supplied token is, or is not, indicative of a particular attribute label. For example, a first attribute labelling module may be configured to apply either an ABN label or an ABSTAIN label to each extracted token of a candidate document; a second attribute labelling module may be configured to apply either an BSB label or an ABSTAIN label to each extracted token of the candidate document; and/or a third attribute labelling module may be configured to apply either an ACC (account number) label or an ABSTAIN label to each extracted token of the candidate document. In some embodiments, one or more of the labelling modules may comprise a plurality of labelling functions, and may accordingly provide as an output, a plurality of preliminary labels. For example, the second attribute labelling module may comprise two or more labelling functions, each configured to apply either an BSB label or an ABSTAIN label to supplied tokens.

At the end of the preliminary labelling phase 104, each token of an example document may be associated with a set of initial or preliminary labels, one preliminary label from each of the attribute labelling function(s). For example, each token may be associated with one or more preliminary attribute values or labels for each of ABN, BSB and/or ACC. The preliminary labelling phase 104 may result in the generation of a preliminary dataset comprising a plurality of items, each item comprising a token and a set of preliminary labels. In some embodiments, the items may include a document identifier indicative of the document from which the token was extracted. In some embodiments, the items may include a position indicator indicative of a position or location of the token within the document from which the token was extracted.

The soft labelling phase 104 is followed by a labelling model training phase 106. The model training phase 106 involves training an expectation maximisation model, such as the Snorkel LabelModel (available from snorkel.readthedocs.io at /en/v0.9.3/packages/_autosummary/labeling/snorkel.labeling.LabelModel.html), to determine a probability or confidence value for each of a set of attribute labels (for example, ABN, BSB and/or ACC) for a candidate token based on the set of preliminary labels for the candidate token. The expectation maximisation model may be trained using the sets of preliminary labels determined in the preliminary labelling phase 104.

Once the expectation maximisation model has been trained, the process moves onto a secondary or refined labelling phase 108. During this phase, the trained labelling model is used to determine or generate confidence values for each attribute label for candidate tokens based on the set of preliminary labels for the respective candidate token as determined in the preliminary labelling phase 104. Accordingly, each token of a document is associated with a set of confidence values for each label of the set of labels. For example, each token may have a confidence level for labels ABN, BSB and ACC.

This may result in the generation of a refined dataset comprising a plurality of items, each item comprising a token and confidence values for each attribute label type of a set of attribute label types. In some embodiments, the items may include a document identifier indicative of the document from which the token was extracted. In some embodiments, the items may include a position indicator indicative of a position or location of the token within the document from which the token was extracted. Each token may then be considered indicative of the attribute label type for which it has the highest confidence value.

In some embodiments, based on the confidence levels for the attribute label(s) (e.g. ABN, BSB and ACC) for the tokens of a document, select token(s) are considered as being indicative of or values for respective attribute labels for the document. For example, of a set of tokens for a particular document, the token with a highest confidence value for a particular attribute, such as ABN, may be considered as being indicative of, or an actual value for, the particular attribute label. Accordingly, the particular attribute label of the document may be associated with the token. For example, an attribute label field for the document may be populated with the token.

In some embodiments, where multiple tokens of a particular document are all considered to be indicative of the same attribute label type (for example, based on the confidence levels for the attribute label(s) (e.g. ABN, BSB and ACC), and those multiple tokens are all of the same value (e.g. have the same character string), the document is labelled or associated with that token for the attribute label type. However, in some embodiments where those multiple tokens are not all of the same value (e.g. at least one has a different character string to another), confidence in the accuracy of the proposed token for the attribute label for the document may not be considered sufficient and the document may remain unlabelled for that attribute type. This may be the case where even a majority of the tokens are of the same value.

This process results in the generation of a dataset of labelled documents, with each document being associated with, or labelled with a value for one or more attribute label types. By taking this approach, there is higher confidence that the attribute labels of the documents are correct.

The labelled documents of the dataset may be used to generate a business directory. For example, the business directory may comprise a plurality of entries, each entry being associated with a specific entity (i.e., an organisation, business and/or individual). The entries may comprise a plurality of fields to be populated by one or more of: an entity name or identifier, such as an Australian Business Number (ABN) and/or Australian Company Number (ACN) or similar, and financial details, such as a Bank State Branch (BSB) code, and/or a bank account number. The data for creating entries and/or populating the fields of the entries may be determined from attributes values of the labelled documents.

In some embodiments, verification of one of the attributes of the labelled documents may be performed using another of the attributes. For example, a determined ABN for a given entity may be used to query a legal business name associated with the ABN from an external validation source, such as the Australian Government Australian Business Register associated with the ABN and to verify and/or correct an entity name determined or extracted directly from the document. This may be implemented as an anti-fraud measure to detect fraudulent invoices. For example, an invoice where the indicated entity on the invoice is not the recorded legal business name for the determined ABN on the Government Australian Business Register may be detected or flagged as potentially fraudulent. Another example may include an invoice where the determined bank details do not match the bank details recorded in the business directory for the determined entity.

The labelled documents of the dataset(s) may be used in training further models, such as machine-learning models, to determine or identify entity attributes associated with candidate documents.

Figure 2:
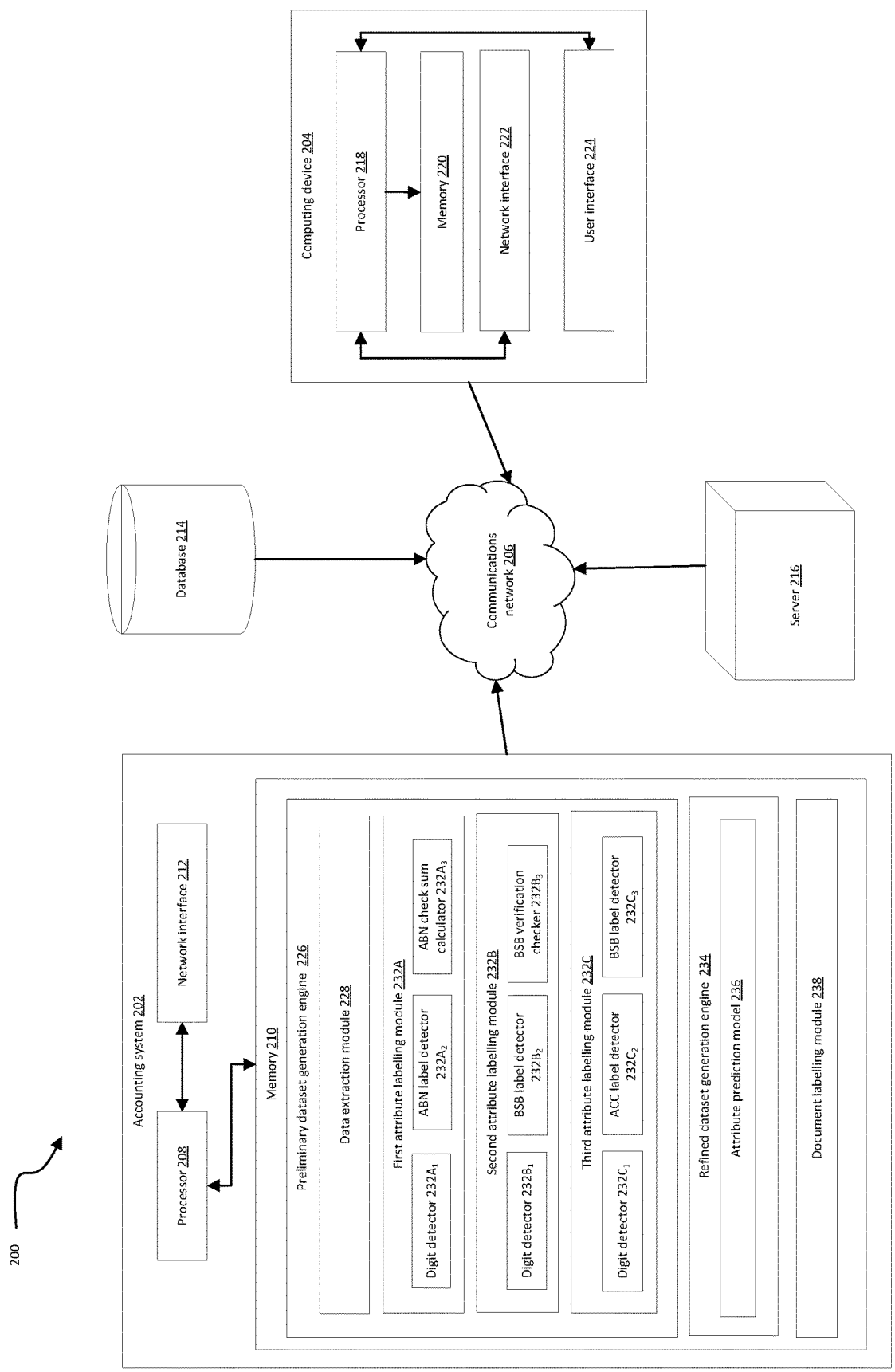
FIG. 2 is a schematic diagram of a communication system comprising a system in communication with one or more computing devices and/or third party systems across a communications network, according to some embodiments.

FIG. 2 is a schematic of a communications system 200 comprising a system 202 in communication with one or more computing devices 204 across a communications network 206. For example, the system 202 may be an accounting system. Examples of a suitable communications network 206 include a cloud server network, wired or wireless internet connection, Bluetooth™ or other near field radio communication, and/or physical media such as USB.

The system 202 comprises one or more processors 208 and memory 210 storing instructions (e.g. program code) which when executed by the processor(s) 208 causes the system 202 to manage data for a business or entity, provide functionality to the one or more computing devices 204 and/or to function according to the described methods. The processor(s) 208 may comprise one or more microprocessors, central processing units (CPUs), application specific instruction set processors (ASIPs), application specific integrated circuits (ASICs) or other processors capable of reading and executing instruction code.

Memory 210 may comprise one or more volatile or non-volatile memory types. For example, memory 210 may comprise one or more of random access memory (RAM), read-only memory (ROM), electrically erasable programmable read-only memory (EEPROM) or flash memory. Memory 210 is configured to store program code accessible by the processor(s) 208. The program code comprises executable program code modules. In other words, memory 210 is configured to store executable code modules configured to be executable by the processor(s) 208. The executable code modules, when executed by the processor(s) 208 cause the system 202 to perform certain functionality, as described in more detail below.

The system 202 further comprises a network interface 212 to facilitate communications with components of the communications system 200 across the communications network 206, such as the computing device(s) 204, database 214 and/or other servers 216. The network interface 212 may comprise a combination of network interface hardware and network interface software suitable for establishing, maintaining and facilitating communication over a relevant communication channel.

The computing device(s) 204 comprise one or more processors 218 and memory 220 storing instructions (e.g. program code) which when executed by the processor(s) 218 causes the computing device(s) 204 to cooperate with the system 202 to provide functionality to users of the computing device(s) 204 and/or to function according to the described methods. To that end, and similarly to the system 202, the computing devices 204 comprise a network interface 222 to facilitate communication with the components of the communications network 206. For example, memory 220 may comprise a web browser application (not shown) to allow a user to engage with the system 202.

The computing device 204 comprises a user interface 224 whereby one or more user(s) can submit requests to the computing device 204, and whereby the computing device 204 can provide outputs to the user. The user interface 224 may comprise one or more user interface components, such as one or more of a display device, a touch screen display, a keyboard, a mouse, a camera, a microphone, buttons, switches and lights.

The communications system 200 further comprises the database 214, which may form part of or be local to the system 202, or may be remote from and accessible to the system 202. The database 214 may be configured to store data, documents and records associated with entities having user accounts with the system 202, availing of the services and functionality of the system 202, or otherwise associated with the system 202. For example, where the system 202 is an accounting system, the data, documents and/or records may comprise business records, banking records, accounting documents and/or accounting records.

The system 202 may also be arranged to communicate with third party servers or systems (not shown), to receive records or documents associated with data being monitored by the system 202. For example, the third party servers or systems (not shown), may be financial institute server(s) or other third party financial systems and the system 202 may be configured to receive financial records and/or financial documents associated with transactions monitored by the system 202. For example, where the system 202 is an accounting system 202, it may be arranged to receive bank feeds associated with transactions to be reconciled by the accounting system 202, and/or invoices or credit notes or receipts associated with transactions to be reconciled from third party entities.

Memory 210 comprises a preliminary dataset generation engine 226, which when executed by the processor(s) 208, causes the system 202 to generate or create a preliminary dataset of preliminary labelled tokens. For example, the preliminary dataset may comprise a plurality of items, each item comprising a token and one or more respective preliminary labels (i.e. a set of preliminary labels). In some embodiments, the items may comprise a document identifier, and/or a position indicator indicative of a position of the token within the document from which it was extracted.

The preliminary dataset generation engine 226 comprises a data extraction module 228. The data extraction module 228 is configured to extract character spans or strings or tokens from text documents that meet a particular set of criteria. For example, the set of criteria may include a requirement that the character span consists of digits only, letters only, digits and letters, spaces and/or hyphens or other types of punctuation, have a specific length range, a minimum and/or maximum number of characters, and/or be bordered by word and/or numeric boundaries. The data extraction module 228 may be configured to determine locations or positions of the tokens within the respective document, for example, x and y coordinates of the tokens.

The preliminary dataset generation engine 226 comprises one or more attribute labelling modules 232. Each attribute labelling module 232 is configured to receive the extracted tokens of a document. Each attribute labelling module 232 is associated with an attribute type. Each attribute labelling module 232 is configured to determine whether or not a candidate extracted token, and in some embodiments, the extracted token in combination with their respective location and/or context feature(s), is indicative of the attribute type of the respective attribute labelling module 232 and to apply or allocate labels to the tokens in accordance with the determination.

For example, a first attribute labelling module 232A may be configured to apply one or more first attribute type labels, each of which may be either an ABN label or an ABSTAIN label, to extracted tokens of a candidate document; a second labelling module 232B may be configured to apply one or more second attribute type labels, each of which may be either an BSB label or an ABSTAIN label, to extracted tokens of the candidate document; and/or a third attribute labelling module 232C may be configured to apply one or more third attribute type labels, each of which may be either an ACC (account number) label or an ABSTAIN label, to extracted tokens of the candidate document. Accordingly, each token is associated with a set of preliminary labels, at least one label being provided by each attribute labelling module 232.

The attribute labelling module(s) may each comprise one or more labelling functions. The labelling functions may be relatively high or relatively low precision labelling functions. The labelling functions may have relatively high or relatively low recall. Two or more of the labelling functions may conflict with each other. Two or more of the labelling functions may correlate with each other.

The first attribute labelling module 232A comprises one or more first labelling functions. In some embodiments, the first label function(s) may comprise a digit detector $232A_1$ configured to detect a number comprising a fixed number span of digits, such as 11 digits, within a candidate token. In some embodiments, the first label function(s) may comprise an ABN label detector $232A_2$ configured to detect the letters/characters or label "ABN" or an approximation of the label "ABN", for example "ABN" with some variation, in proximity to a location of the candidate token, as for example, may have been detected by the digit detector $232A_1$. In some embodiments, the first label function(s) may comprise a ABN check sum calculator $232A_3$ configured to verify that a span of digits detected by the digit detector $232A_1$ is an ABN. The 11 digit ABN is structured as a 9 digit identifier with two leading check digits. The leading check digits are derived using a modulus 89 (remainder after dividing by 89) calculation. For example, the ABN check sum calculator $232A_3$ may be configured to subtract 1 from the left most digit of the candidate token (i.e. the detected span of digits) to determine a modified span of digits, multiply each of the digits in the modified span of digits by a weighting factor, sum the resulting 11 products, divide the sum by 89, noting the remainder. If the remainder is zero, the ABN check sum calculator $232A_3$ may determine that the candidate token is an ABN. Suitable values for weighting factors can be determined from the Australian Government Australian Business Register ABN Lookup (available from abr.business.gov.au at Help at/AbnFormat), for example.

The second attribute labelling module 232B comprises one or more second labelling functions. In some embodiments, the second label function(s) may comprise a digit detector $232B_1$ configured to detect a number comprising a fixed number span of digits, such as 6 digits, or a first and second fixed number span of digits separated by a hyphen (i.e. 3 digit-3 digits format), within a candidate token. The second label function(s) may comprise a BSB label detector $232B_2$ configured to detect the letters/characters or label "BSB" or an approximation of the label "BSB", for example "BSB" with some variation, in proximity to a location of the candidate token location, as for example, may have been detected by the digit detector $232B_1$. For example, the BSB label detector $232B_2$ may be configured to detect the "BSB" label to the left of the candidate token location. The second label function(s) may comprise a BSB verification checker $232B_3$ configured to check if the digits detected by the digit detector $232B_1$, or a normalised version of the digits detected by the digit detector $232B_1$, correspond with a known BSB. For example, a list of known or existing BSB's may be acquired from a third party source, such as the Australian Payments Network (available from bsb.auspaynet.com.au).

In some embodiments, if the verification checker $232B_3$ determines that the digits detected by the digit detector $232B_1$, or a normalised version of the digits detected by the digit detector $232B_1$, are invalid, the system 202 may remove the token from the preliminary dataset. This may assist in mitigating the prediction of non-existent BSB numbers for documents.

In some embodiments, the third attribute labelling module 232C comprises one or more third labelling functions. In some embodiments, the third label function(s) may comprise a digit detector $232C_1$ configured to detect a number comprising a fixed number span of digits, such as a span of digits of between 6 and 10 digits long within a candidate token. The digit detector $232C_1$ may electively disregard any numbers containing a hyphen or other punctuation characters, for example. The second label function(s) may comprise an ACC label detector $232C_2$ configured to detect the letters/characters or label "ACC" or "account" or an approximation of the label "ACC" or "account" (for example "ACC" or "account" with some variation) in proximity to a location of the candidate token, as for example, may have been detected by the digit detector $232C_1$. For example, the ACC label detector $232C_2$ may be configured to detect the "ACC" or "account" label to the left of the candidate token location. The third label function(s) may comprise a BSB label detector $232C_3$ configured to detect the letters/characters or label "BSB" or an approximation of the label "BSB", for example "BSB" with some variation, in proximity to a location of the candidate token location, as for example, may have been detected by the digit detector $232B_1$, or the BSB label detector $232B_2$, or the ACC label detector $232C_2$. In some embodiments, the BSB label detector $232C_3$ may be configured to detect a span of digits, which may for example, be indicative of the BSB number, between the location of the BSB label and the ACC label locations. For example, the BSB label detector $232C_2$ may be configured to detect the "BSB" label and/or the BSB digits to the left of the location of the number detected by the digit detector $232C_1$.

In some embodiments, if the second attribute labelling module 232B does not determine a valid BSB number for a token, the system 202 may elect to discard any ACC number detected by the third attribute labelling module 232C. For example, it may be considered unlikely that an ACC number would appear in a document without a valid BSB number.

In some embodiments, one or more of the attribute labelling modules 232 may determine that more than one of the tokens of a given document is indicative of the respective attribute. For example, the first attribute labelling module 232A may identify two separate tokens as being indicative of an ABN. In some embodiments, where more than one unique first, second and/or third attribute values are determined for a particular token, the system 202 may disregard that token, and may for example, remove it from the preliminary dataset. In embodiments where multiple tokens of a same document are determined as being of a particular attribute type, and they each have the same normalised value, the system 202 may discard all but the last token appearing in the document as payment details are often found at the bottom of a document.

The preliminary dataset of preliminary labelled tokens may be stored in database 214, for example.

Memory 210 comprises a refined dataset generation engine 234, which when executed by the processor(s) 208, causes the system 202 to generate or create a refined dataset of refined labelled tokens. For example, the refined dataset may comprise a plurality of items, each item comprising a token and one or more respective refined labels (i.e. a set of refined labels). In some embodiments, the items may comprise a document identifier, and/or a position indicator indicative of a position of the token within the document from which it was extracted. The refined dataset of refined labelled tokens may be stored in database 214, for example.

The refined dataset generation engine 234 comprises an attribute prediction model 236. The attribute prediction model 236 is configured to determine or predict a probability or confidence value for each attribute label of an attribute set (for example, ABN, BSB and/or ACC) for a candidate token. The attribute prediction model 236 is configured to receive as an input, the set of preliminary labels of a candidate token, as determined by the preliminary dataset generation engine 226. In some embodiments, the attribute prediction model 236 is trained using the sets of preliminary labels of the preliminary dataset, as determined using the preliminary dataset generation engine 226.

The attribute prediction model 236 may be a generative model, that is, one that approximates the probability of an output Y for a candidate token based on the preliminary labels of the candidate token without needing ground truth Y. The attribute prediction model 236 may comprise an expectation maximisation model. For example, the attribute prediction model 236 may be the Snorkel LabelModel.

Memory 210 comprises a document labelling module 238 which when executed by the processor(s) 208, causes the system 202 to label or annotate documents with values for one or more attribute label types. The document labelling module 238 is configured to use the refined dataset to determine values for attribute label(s) for documents from which the tokens of the refined dataset have been extracted.

In some embodiments, the document labelling module 238 may be configured to determine a subset of items of the refined dataset that relate to a specific document. The document labelling module 238 may be configured to group items of the refined dataset by document. For example, the document labelling module 238 may determine the subset of items or groups based on document identifiers of the items. Based on the confidence levels for the attribute label(s) (e.g. ABN, BSB and ACC) for the tokens of the subset, the document labelling module 238 may select suitable attribute label values for the document. For example, the document labelling module 238 may be configured to determine a token having a highest confidence value for a specific attribute label as being the value for that specific attribute label for the document. In some embodiments, responsive to the highest confidence value for a specific attribute type being less than a threshold value, the document labelling module 238 may elect to not allocate a value to the document for that attribute type. In some embodiments, responsive to confidence values levels for each attribute label type of the set of attribute label types for a given token falling short of a threshold confidence level, the document labelling module 238 disregards the token, or removes the token from the refined dataset. For example, the threshold confidence level may be 0.6, thereby indicating a definite preference over the other two potential labels. In this way, only attribute values which the system 202 deems to be sufficiently likely to be indicative to the attribute type for the document are actually used as labels for the document. The document labelling module 238 may be configured to determine a plurality of subsets of items, each associated with a different document, and to label each of the documents with a set of attribute values based on confidence values of the attribute label(s) for the associated tokens.

Figure 3:
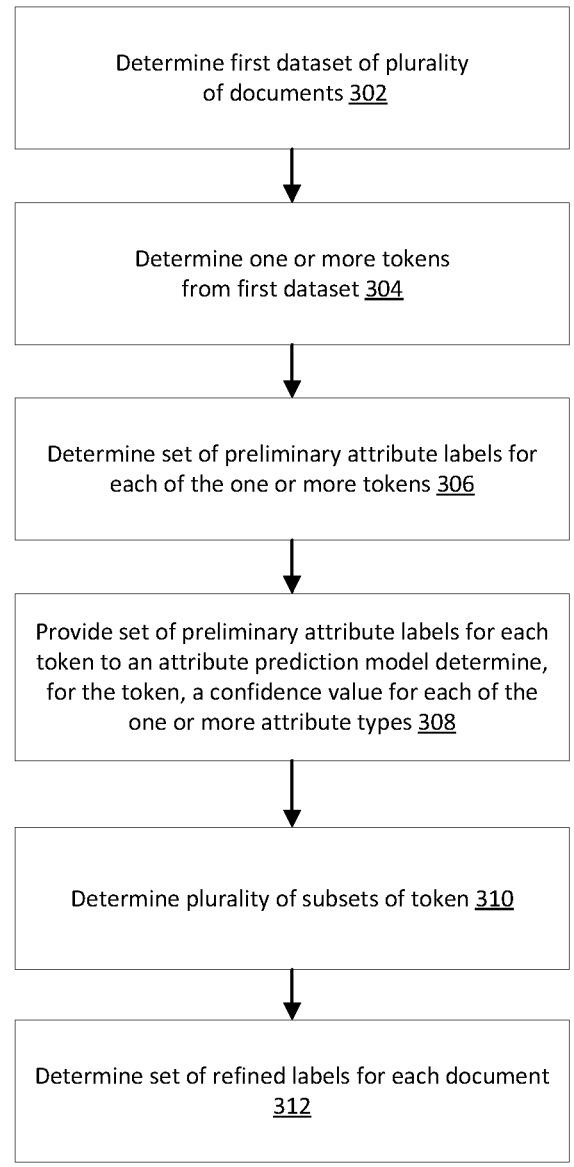
FIG. 3 is a process flow diagram of a method of determining a dataset of labelled documents, according to some embodiments.

FIG. 3 is a process flow diagram of a method of determining a dataset of labelled documents, according to some embodiments. The method 300 may, for example, be implemented by the processor(s) 208 of system 202 executing instructions stored in memory 210.

At 302, the system 202 determines a first dataset comprising a plurality of documents. For example, the documents may be financial or accounting documents, such as invoices, receipts, credit notes, purchase orders, quotes and the like. A plurality of the documents may comprise entity attribute information, for example, as text within the body of the document. The type of entity attribute information may have one or more inherent characteristics determinable from its respective value.

At 304, the system 202 determines one or more tokens from each of the plurality of documents of the first dataset. The system 202 may generate an initial dataset comprising a plurality of items, each item including one of the tokens determined from the documents of the first dataset. Each item may further include a document identifier, indicative of the document from which the token was determined, and/or a position or location indicator, indicative of the position of the token within the document from which the token was determined.

In some embodiments, the system 202 extracts one or more character spans or tokens from each document in the first dataset in accordance with a set of rules or criteria appropriate to the attribute types of interest. The set of rules or criteria appropriate to the attribute types of interest may depend on the inherent characteristic(s) of the attribute type. For example, the system 202 may be configured to extract tokens matching the regular expression '\bd[\d-]{5,}\b' from the text document; in other words, a span of characters consisting of only digits, spaces and/or hyphens, of at least 6 characters long, and bordered by word boundaries.

At 306, the system 202 determines a set of preliminary attribute labels for each of the one or more tokens. The set of attribute labels may be associated with one or more attribute types, such as ABN, BSB and/or account number.

The system 202 may provide the token(s) to one or more attribute labelling modules to determine, for each token, the sets of preliminary attribute labels. Each of the attribute labelling module(s) may be configured to determine preliminary attribute labels of a different attribute type. In some embodiments, one or more of the attribute labelling modules each comprise multiple label functions, each label function of an attribute labelling module being configured to determine whether or not a given token is representative of a particular attribute type.

In some embodiments, the attribute labelling module(s) 232 comprises a first digit detector 232A$_1$ configured to detect a fixed number span of digits within a candidate token, and responsive to the first digit detector 232A$_1$ determining that the candidate token comprises the fixed number span of digits, the first digit detector 232A$_1$ assigns the candidate token a first preliminary label of a first attribute type, and responsive to the first digit detector 232A$_1$ determining that the candidate token does not comprise the fixed number span of digits, the first digit detector 232A$_1$ assigns candidate token a first preliminary label indicative of the token not being representative of the first attribute type.

In some embodiments, the attribute labelling module(s) 232 comprises a first label detector 232A$_2$ configured to detect a character stream in a proximal token to the candidate token that corresponds to a first label of the first attribute type, and responsive to the first label detector 232A$_2$ determining that the proximal token comprises the character stream corresponding to the first label, the first label detector 232A$_2$ assigns the candidate token a second preliminary label of the first attribute type, and responsive to the first label detector 232A$_2$ determining that the proximal token does not comprise the character stream corresponding to the first label, the first label detector 232A$_2$ assigns the candidate token a second preliminary label indicative of the candidate token not being representative of the first attribute type.

In some embodiments, the attribute labelling module(s) 232 comprises a check sum calculator 232A$_3$ configured to verify that a span of digits detected by the first digit detector 232A$_1$ is a number that complies requirements of the first attribute type, and responsive to the check sum calculator 232A$_3$ determining that the number complies with the requirements, the check sum calculator 232A$_3$ assigns the candidate token a third preliminary label of the first attribute type, and responsive to the check sum calculator 232A$_3$ determining that the candidate token does not comply with the requirements, the check sum calculator 232A$_3$ assigns the candidate token a third preliminary label indicative of the token not being representative of the first attribute type.

In some embodiments, the attribute labelling module(s) 232 comprises a second digit detector 232B$_1$ configured to detect a fixed number span of digits within a candidate token, and responsive to the second digit detector 232B$_1$ determining that the candidate token comprises the fixed number span of digits, the second digit detector 232B$_1$ assigns the candidate token a first preliminary label of a second attribute type, and responsive to the second digit detector 232B$_1$ determining that the candidate token does not comprise the fixed number span of digits, the second digit detector 232B$_1$ assigns the candidate token a first preliminary label indicative of the candidate token not being representative of the second attribute type.

In some embodiments, the attribute labelling module(s) 232 comprises a second label detector 232B$_2$ configured to detect a character stream in a proximal token to the candidate token that corresponds to a second label of the second attribute type, and responsive to the second label detector 232B$_2$ determining that the proximal token comprises the character stream corresponding to the second label, the second label detector 232B$_2$ assigns the candidate token a second preliminary label of the second attribute type, and responsive to the second label detector 232B$_2$ determining that the proximal token does not comprise the character stream corresponding to the second label, the second label detector 232B$_2$ assigns the candidate token a second preliminary label indicative of the candidate token not being representative of the second attribute type.

In some embodiments, the attribute labelling module(s) 232 comprises a verification checker 232B$_3$ configured to verify that a span of digits detected by the second digit detector 232B$_1$ is a number that corresponds with a registered number for the second attribute type, and responsive to the verification checker 232B$_3$ determining that the number corresponds with the registered number, the verification checker 232B$_3$ assigns the candidate token a third preliminary label of the second attribute type, and responsive to the verification checker 232B$_3$ determining that the candidate token does not comply with the requirements, the verification checker 232B$_3$ assigns the candidate token a third preliminary label indicative of the token not being representative of the second attribute type.

In some embodiments, the attribute labelling module(s) 232 comprises a third digit detector 232C$_1$ configured to detect a fixed number span of digits within a candidate token, and responsive to the third digit detector 232C$_1$ determining that the candidate token comprises the fixed number span of digits, the third digit detector 232C$_1$ assigns the candidate token a first preliminary label of a third attribute type, and responsive to the third digit detector 232C$_1$ determining that the candidate token does not comprise the fixed number span of digits, the third digit detector 232C$_1$ assigns the candidate token a first preliminary label indicative of the token not being representative of the third attribute type.

In some embodiments, the attribute labelling module(s) 232 comprises a third label detector 232C$_2$ configured to detect a character stream in a first proximal token to the candidate token that corresponds to a third label of the third attribute type. Responsive to the third label detector 232C$_2$ determining that the first proximal token comprises the character stream corresponding to the third label, the third label detector 232C$_2$ assigns the candidate token a second preliminary label of the third attribute type, and responsive to the third label detector 232C$_2$ determining that the first proximal token does not comprise the character stream corresponding to the third label, the third label detector 232C$_2$ assigns the candidate token a second preliminary label indicative of the candidate token not being representative of the third attribute type.

In some embodiments, the attribute labelling module(s) 232 comprises a fourth label detector 232C$_3$ configured to detect a character stream in a second proximal token, proximal to the candidate token and/or the first proximal token, that corresponds to a fourth label of the third attribute type. Responsive to the fourth label detector 232C$_3$ determining that the second proximal token comprises the character stream corresponding to the fourth label, the fourth label detector 232C₃ assigns the candidate token a third preliminary label of the third attribute type, and responsive to the fourth label detector 232C₃ determining that the second proximal token does not comprise the character stream corresponding to the fourth label, the fourth label detector 232C₃ assigns the candidate token a third preliminary label indicative of the candidate token not being representative of the third attribute type.

For example, the first attribute type may be an entity name, a business name and/or a company name, or an entity identifier, business number and/or company number, the second attribute type may comprise first financial details such as a financial institution or bank branch code and/or the third attribute type may comprise second financial details such a financial institution or bank account number.

The set of preliminary attribute labels may be collated, saved or stored in a preliminary dataset. For example, the preliminary dataset may comprise a plurality of items, each item comprising a token, and a set of preliminary labels, and in some embodiments, a document identifier, and/or a position identifier of the token within the document.

At 308, the system 202 provides the set of preliminary attribute labels for each token to an attribute prediction model 236 to determine, for the token, a confidence value for each of the one or more attribute types. As mentioned above, the attribute prediction model 236 may comprise an expectation maximisation model.

In some embodiments, the system 202 is configured to train the attribute prediction model 236 using the sets of preliminary attribute labels for the tokens. This may be performed before the system provides the sets of preliminary attribute labels for each token to the attribute prediction model 236 to determine the confidence values for each token.

At 310, the system 202 determines a plurality of subsets of tokens, each subset being associated with a respective document of the plurality of documents.

At 312, the system 202 determines a set of refined labels for each document based on the confidence values associated with the tokens of the respective subset of tokens. The set of refined labels comprises a value for the one or more attribute types.

In some embodiments, if the system 202 determines that the confidence value for each attribute label type of the set of attribute label types for a given token falls short of a threshold confidence level, the token is removed from the subset of tokens before determining the set of refined labels for the respective document. In some embodiments, the system 202 determines, for each of the one or more attribute types, a token of the subset of tokens having a highest confidence value, and assigns the attribute type the value of the respective token. In some embodiments, if the system 202 determines that the highest confidence value for a specific attribute type is less than a threshold value, the system 202 may elect to not allocate a value to the document for that attribute type.

In some embodiments, where multiple tokens of a particular document are all considered to be indicative of the same attribute label type (for example, based on the confidence levels for the attribute label(s) (e.g. ABN, BSB and ACC), and those multiple tokens are all of the same value (e.g. have the same character string), the document is labelled or associated with that token for the attribute label type. However, in some embodiments where those multiple tokens are not all of the same value (e.g. at least one has a different character string to another), confidence in the accuracy of the proposed token for the attribute label for the document may not be considered sufficient and the document may remain unlabelled for that attribute type. This may be the case where even a majority of the tokens are of the same value.

The system 202 may save or record the document and their respective sets of refined labels in a labelled dataset, and which may, for example, be stored in database 214.

The labelled documents may be used for various purposes. For example, the labelled documents of the labelled dataset may be used to generate a business directory. The business directory may comprise a plurality of entries, each entry being associated with a specific entity (i.e., an organisation, business and/or individual). The entries may comprise a plurality of fields to be populated by one or more of: an entity name, such as an Australian Business Number (ABN) and/or Australian Company Number (ACN) or similar, and financial details, such as a Bank State Branch (BSB) code, and/or a bank account number. The data for creating entries and/or populating the fields of the entries may be determined from attributes values of the labelled documents. The labelled documents of the dataset(s) may be used in training further models, such as machine-learning models, to determine or identify entity attributes associated with candidate documents.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

What is claimed is:

1. A computer-implemented method comprising:
    determining one or more tokens from each of a plurality of financial documents from a database;
    determining a set of preliminary attribute labels for each of the one or more tokens, wherein sets of preliminary attribute labels are associated with one or more attribute types;
    training an attribute prediction model comprising an expectation maximization model, wherein the training comprises:
        determining sets of preliminary attribute labels using multiple attribute labeling modules, each module configured to determine preliminary labels for a different attribute type; and
        training the expectation maximization model to determine a confidence value for each of a set of attribute labels for a candidate token based on the set of preliminary labels for the candidate token, wherein the expectation maximization model is trained using the sets of preliminary attribute labels for the respective one or more tokens, and wherein determining the confidence value for each token comprises:
            analyzing correlations between preliminary labels from different attribute labeling modules for the candidate token;
            detecting conflicts between the preliminary labels, wherein a conflict occurs when different preliminary labels indicate different attribute types for the same token;
            determining a reliability score for each preliminary label based on the analyzed correlations and detected conflicts; and
            generating the confidence value by combining the preliminary labels weighted by their respective reliability scores;

providing the set of preliminary attribute labels for each token to the trained attribute prediction model;

generating, by the trained attribute prediction model, for each token, a confidence value for each preliminary attribute label;

determining a plurality of subsets of tokens, each subset being associated with a respective document of the plurality of financial documents;

determining a set of refined labels for each document based on the confidence value associated with the tokens of a respective subset of tokens of the plurality of subsets of tokens, wherein the set of refined labels comprises a value for one or more attribute types, wherein determining the set of refined labels for each financial document based on the confidence values comprises:

determining, for each of the one or more attribute types, a respective token of the subset of tokens having a highest confidence value; and assigning each of the one or more attribute types, the respective token having the highest confidence value; and training an entity attribute identification model using the set of refined labels and the respective documents to configure entity attribute identification model to determine entity attributes associated with candidate documents.

2. The computer-implemented method of claim 1, wherein each of the one or more attribute types has one or more inherent characteristics determinable from its respective value.

3. The computer-implemented method of claim 2, wherein determining the one or more tokens from each of the plurality of financial documents comprises determining the one or more tokens based on at least one of the one or more inherent characteristics of the one or more attribute types.

4. The computer-implemented method of claim 1, wherein determining the sets of preliminary attribute labels comprises:

providing the one or more tokens to one or more attribute labelling modules to determine, for each token, the sets of preliminary attribute labels, wherein each of the one or more attribute labelling modules is configured to determine preliminary attribute labels of a different attribute type.

5. The computer-implemented method of claim 4, wherein the one or more attribute labelling modules comprises a first digit detector configured to detect a fixed number span of digits within a candidate token, the method further comprising:

responsive to determining that the candidate token comprises the fixed number span of digits, assigning the candidate token a first preliminary label of a first attribute type; and responsive to determining that the candidate token does not comprise the fixed number span of digits, assigning the candidate token a first preliminary label indicative of the token not being representative of the first attribute type.

6. The computer-implemented method of claim 5, wherein the one or more attribute labelling modules comprises a first label detector configured to detect a character stream in a proximal token to the candidate token that corresponds to a first label of the first attribute type, the method further comprising:

responsive to determining that the proximal token comprises the character stream corresponding to the first label, assigning the candidate token a second preliminary label of the first attribute type; and responsive to determining that the proximal token does not comprise the character stream corresponding to the first label, assigning the candidate token a second preliminary label indicative of the candidate token not being representative of the first attribute type.

7. The computer-implemented method of claim 5, wherein the one or more attribute labelling modules comprises a check sum calculator configured to verify that a span of digits detected by the first digit detector is a number that complies with requirements of the first attribute type, the method further comprising:

responsive to determining that the number complies with the requirements, assigning the candidate token a third preliminary label of the first attribute type; and responsive to determining that the candidate token does not comply with the requirements, assigning the candidate token a third preliminary label indicative of the token not being representative of the first attribute type.

8. The computer-implemented method of claim 4, wherein the one or more attribute labelling modules comprises a second digit detector configured to detect a fixed number span of digits within a candidate token, the method further comprising:

responsive to determining that the candidate token comprises the fixed number span of digits, assigning the candidate token a first preliminary label of a second attribute type; and responsive to determining that the candidate token does not comprise the fixed number span of digits, assigning the candidate token a first preliminary label indicative of the candidate token not being representative of the second attribute type.

9. The computer-implemented method of claim 8, wherein the one or more attribute labelling modules comprises a second label detector configured to detect a character stream in a proximal token to the candidate token that corresponds to a second label of the second attribute type, the method further comprising:

responsive to determining that the proximal token comprises the character stream corresponding to the second label, assigning the candidate token a second preliminary label of the second attribute type; and responsive to determining that the proximal token does not comprise the character stream corresponding to the second label, assigning the candidate token a second preliminary label indicative of the candidate token not being representative of the second attribute type.

10. The computer-implemented method of claim 8, wherein the one or more attribute labelling modules comprises a verification checker configured to verify that a span of digits detected by the second digit detector is a number that corresponds with a registered number for the second attribute type, the method further comprising:

responsive to determining that the number corresponds with the registered number, assigning the candidate token a third preliminary label of the second attribute type; and responsive to determining that the candidate token does not comply with requirements, assigning the candidate token a third preliminary label indicative of the token not being representative of the second attribute type.

11. The computer-implemented method of claim 4, wherein the one or more attribute labelling modules comprises a third digit detector configured to detect a fixed number span of digits within a candidate token, the method further comprising:
  responsive to determining that the candidate token comprises the fixed number span of digits, assigning the candidate token a first preliminary label of a third attribute type; and
  responsive to determining that the candidate token does not comprise the fixed number span of digits, assigning the candidate token a first preliminary label indicative of the token not being representative of the third attribute type.

12. The computer-implemented method of claim 11, wherein the one or more attribute labelling modules comprises a third label detector configured to detect a character stream in a first proximal token to the candidate token that corresponds to a third label of the third attribute type, the method further comprising:
  responsive to determining that the first proximal token comprises the character stream corresponding to the third label, assigning the candidate token a second preliminary label of the third attribute type; and
  responsive to determining that the first proximal token does not comprise the character stream corresponding to the third label, assigning the candidate token a second preliminary label indicative of the candidate token not being representative of the third attribute type.

13. The computer-implemented method of claim 11, wherein the one or more attribute labelling modules comprises a fourth label detector configured to detect a character stream in a second proximal token, proximal to the candidate token and/or a first proximal token, that corresponds to a fourth label of the third attribute type, the method further comprising:
  responsive to determining that the second proximal token comprises the character stream corresponding to the fourth label, assigning the candidate token a third preliminary label of the third attribute type; and
  responsive to determining that the second proximal token does not comprise the character stream corresponding to the fourth label, assigning the candidate token a third preliminary label indicative of the candidate token not being representative of the third attribute type.

14. The computer-implemented method of claim 1, further comprising:
  responsive to the confidence value for each attribute label type of the set of attribute label types for a given token falling short of a threshold confidence level, removing the given token from the subsets of tokens before determining the set of refined labels for a respective document.

15. The computer-implemented method of claim 1, wherein the one or more attribute types comprise one or more of: (i) an entity name, (ii) a business name; (iii) a company name; (iv) financial details; (v) a financial institution branch code; and (vi) a financial institution account number; and wherein the plurality of financial documents are accounting documents and wherein a class of the accounting documents includes one or more of: (i) an invoice; (ii) a credit note; (iii) a receipt; (iv) a purchase order; and (v) a quote.

16. The computer-implemented method of claim 1, further comprising:
  for at least one of the financial documents, populating an entry in a business directory with the determined token for at least one of the one or more attribute types.

17. The computer-implemented method of claim 1, further comprising:
  for at least one of the financial documents, querying a business directory with the determined token for at least one of the one or more attribute types to determine one or more further attribute values.

18. The computer-implemented method of claim 1, further comprising:
  for at least one of the financial documents, querying a register with the determined token for at least one of the one or more attribute types;
  responsive to determining that a value of at least one of the one or more attribute types corresponds with a respective attribute value of the register, verifying the value of the at least one of the one or more attribute types; and
  responsive to determining that the value of the at least one of the one or more attribute types does not correspond with the respective attribute value of the register, flagging the at least one of the financial documents as potentially fraudulent.

19. A system comprising:
one or more processors; and
memory comprising computer executable instructions, which when executed by the one or more processors, cause the system to perform operations including:
  determining one or more tokens from each of a plurality of financial documents from a database;
  determining a set of preliminary attribute labels for each of the one or more tokens, wherein the set of attribute labels are associated with one or more attribute types;
  training an attribute prediction model comprising an expectation maximization model, wherein the training comprises:
    determining sets of preliminary attribute labels using multiple attribute labeling modules, each module configured to determine preliminary labels for a different attribute type; and
  training the expectation maximization model to determine a confidence value for each of a set of attribute labels for a candidate token based on the set of preliminary labels for the candidate token, wherein the expectation maximization model is trained using the sets of preliminary attribute labels for the respective one or more tokens, and wherein determining the confidence value for each token comprises:
    analyzing correlations between preliminary labels from different attribute labeling modules for the candidate token;
    detecting conflicts between the preliminary labels, wherein a conflict occurs when different preliminary labels indicate different attribute types for the same token;
    determining a reliability score for each preliminary label based on the analyzed correlations and detected conflicts; and
    generating the confidence value by combining the preliminary labels weighted by their respective reliability scores;
  providing the set of preliminary attribute labels for each token to the trained attribute prediction model;
  generating, by the trained attribute prediction model, for each token, a confidence value for each preliminary attribute label;

determining a plurality of subsets of tokens, each subset being associated with a respective document of the plurality of financial documents;

determining a set of refined labels for each document based on the confidence value associated with the tokens of a respective subset of tokens of the plurality of subsets of tokens, wherein the set of refined labels comprises a value for one or more attribute types, wherein determining the set of refined labels for each financial document based on the confidence values comprises:

determining, for each of the one or more attribute types, a respective token of the subset of tokens having a highest confidence value; and assigning each of the one or more attribute types, the respective token having the highest confidence value; and training an entity attribute identification model using the set of refined labels and the respective documents to configure entity attribute identification model to determine entity attributes associated with candidate documents.

20. A non-transient computer-readable storage medium storing instructions that, when executed by a computer, cause the computer to perform operations including:

determining one or more tokens from each of a plurality of financial documents from a database;

determining a set of preliminary attribute labels for each of the one or more tokens, wherein the set of attribute labels are associated with one or more attribute types;

training an attribute prediction model comprising an expectation maximization model wherein the training comprises:

determining sets of preliminary attribute labels using multiple attribute labeling modules, each module configured to determine preliminary labels for a different attribute type; and training the expectation maximization model to determine a confidence value for each of a set of attribute labels for a candidate token based on the set of preliminary labels for the candidate token, wherein the expectation maximization model is trained using the sets of preliminary attribute labels for the respective one or more tokens, and wherein determining the confidence value for each token comprises:

analyzing correlations between preliminary labels from different attribute labeling modules for the candidate token;

detecting conflicts between the preliminary labels, wherein a conflict occurs when different preliminary labels indicate different attribute types for the same token;

determining a reliability score for each preliminary label based on the analyzed correlations and detected conflicts; and generating the confidence value by combining the preliminary labels weighted by their respective reliability scores;

providing the set of preliminary attribute labels for each token to the trained attribute prediction model;

generating, by the trained attribute prediction model, for each token, a confidence value for each preliminary attribute label;

determining a plurality of subsets of tokens, each subset being associated with a respective document of the plurality of financial documents;

determining a set of refined labels for each document based on the confidence value associated with the tokens of a respective subset of tokens of the plurality of subsets of tokens, wherein the set of refined labels comprises a value for one or more attribute types, wherein determining the set of refined labels for each financial document based on the confidence values comprises:

determining, for each of the one or more attribute types, a respective token of the subset of tokens having a highest confidence value; and assigning each of the one or more attribute types, the respective token having the highest confidence value; and training an entity attribute identification model using the set of refined labels and the respective documents to configure entity attribute identification model to determine entity attributes associated with candidate documents.

* * * * *